United States Patent [19]

Wehner et al.

[11] Patent Number: 4,656,209
[45] Date of Patent: Apr. 7, 1987

[54] CHLORINATED THERMOPLASTICS STABILIZED WITH AMINOURACILS

[75] Inventors: Wolfgang Wehner, Zwingenberg; Hermann O. Wirth, Bensheim, both of Fed. Rep. of Germany

[73] Assignee: Ciba-Geigy Corporation, Ardsley, N.Y.

[21] Appl. No.: 378,540

[22] Filed: May 17, 1982

[30] Foreign Application Priority Data

May 26, 1982 [CH] Switzerland .................. 3440/82

[51] Int. Cl.$^4$ ............................................. C08K 5/34
[52] U.S. Cl. ........................................ 524/87; 524/91; 524/99; 524/100; 524/109; 524/117; 524/120; 524/147; 524/151; 524/153
[58] Field of Search ...................... 524/87, 91, 99, 100

[56] References Cited

U.S. PATENT DOCUMENTS 3,436,362  4/1969  Hayer et al. ................... 524/100
4,352,903  10/1982  Abeler ............................ 524/100

OTHER PUBLICATIONS

C.A. 46, 10196a (1952).

Primary Examiner—John Kight
Assistant Examiner—Kriellian Morgan
Attorney, Agent, or Firm—Luther A. R. Hall

[57] ABSTRACT

The invention relates to thermoplastic molding compositions based on vinyl chloride polymers and containing, as stabilizer, 0.1 to 5% by weight of an aminouracil of the formula I

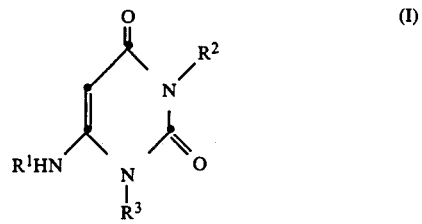

wherein $R^1$ is hydrogen, $C_1$–$C_8$alkyl, $C_5$–$C_8$cycloalkyl, phenyl, benzyl, $C_1$–$C_4$hydroxyalkyl, hydroxyphenyl, $C_2$–$C_8$alkoxyalkyl, $C_2$–$C_8$alkylthioalkyl, $C_6$–$C_{10}$cycloalkoxyalkyl, $C_6$–$C_{10}$cycloalkylthioalkyl, $C_8$–$C_{14}$aralkoxyalkyl, $C_8$–$C_{14}$aralkylthioalkyl, $C_7$–$C_{14}$aryloxyalkyl, $C_7$–$C_{14}$arylthioalkyl, —$NHR^4$, in which $R^4$ is hydrogen, phenyl or chlorine-substituted phenyl, and $R^2$ and $R^3$, each independently of the other, are $C_2$–$C_{21}$alkyl, $C_6$–$C_{12}$aryl or $C_7$–$C_{19}$aralkyl, while one of $R^2$ and $R^3$ may also be hydrogen.

The addition of such aminouracils gives vinyl chloride polymers which are very well protected against heat-induced degradation. The aminouracils cause no haze in the polymer to be protected.

10 Claims, No Drawings

CHLORINATED THERMOPLASTICS STABILIZED WITH AMINOURACILS

The present invention relates to chlorinated thermoplastics which are stabilised with aminouracils, and to the use of specific aminouracils for stabilising such substrates.

The use of aminouracils as stabilisers for PVC, in particular of 1,3-dimethyl-6-aminouracil and 1,3-dimethyl-6-anilinouracil, is known from German Auslegeschrift No. 1 694 873. It has been found, however, that these known stabilisers for PVC do not always satisfy the exacting demands of actual practice. Their effectiveness, i.e. their compatibility with the substrate, is insufficient. For example, 1,3-dimethyl-6-aminouracil gives rise to pronounced haze in moulding compounds stabilised therewith. It is the object of the present invention to provide stabilisers which do not have these shortcomings.

Accordingly, the present invention provides thermoplastic moulding compositions based on vinyl chloride polymers, which compositions contain 0.1 to 5% by weight of an aminouracil of the formula I

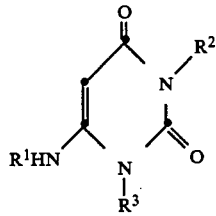

wherein $R^1$ is hydrogen, $C_1$–$C_8$alkyl, $C_5$–$C_8$cycloalkyl, phenyl, benzyl, $C_1$–$C_4$hydroxyalkyl, hydroxyphenyl, $C_2$–$C_8$alkoxyalkyl, $C_2$–$C_8$alkylthioalkyl, $C_6$–$C_{10}$cycloalkoxyalkyl, $C_6$–$C_{10}$cycloalkylthioalkyl, $C_8$–$C_{14}$aralkoxyalkyl, $C_8$–$C_{14}$aralkylthioalkyl, $C_7$–$C_{14}$aryloxyalkyl, $C_7$–$C_{14}$arylthioalkyl, $-NHR^4$, in which $R^4$ is hydrogen, phenyl or chlorine-substituted phenyl, and $R^2$ and $R^3$, each independently of the other, are $C_2$–$C_{21}$alkyl, $C_6$–$C_{12}$aryl or $C_7$–$C_{19}$aralkyl, whilst one of $R^2$ and $R^3$ may also be hydrogen.

$R^1$ and $R^4$ as $C_1$–$C_8$alkyl are e.g. methyl, ethyl, n-propyl, isopropyl, n-butyl, sec-butyl, tert-butyl, pentyl, hexyl, heptyl or octyl.

$R^1$ as cycloalkyl is e.g. cyclopentyl, cycloheptyl and, in particular, cyclohexyl.

$R^1$ as $C_1$–$C_4$hydroxyalkyl may be e.g. hydroxymethyl, 1-hydroxyethyl and, in particular, 2-hydroxyethyl.

$R^1$ as $C_2$–$C_8$alkoxyalkyl contains preferably 1 to 6 carbon atoms in the alkoxy moiety and 1 to 2 carbon atoms in the alkyl moiety, and is in particular ethoxymethyl, ethoxyethyl, methoxyethyl or methoxymethyl.

$R^1$ as $C_2$–$C_8$alkylthioalkyl contains preferably altogether 2 to 4 carbon atoms and is in particular methylthiomethyl, ethylthiomethyl, methylthioethyl or ethylthioethyl.

$R^1$ as $C_6$–$C_{19}$cycloalkoxyalkyl is preferably cyclohexyloxymethyl or cyclohexyloxyethyl, and $R_1$ as $C_6$–$C_{10}$cycloalkylthioalkyl is preferably cyclohexylthiomethyl or cyclohexylthioethyl.

$R^1$ as $C_8$–$C_{14}$aralkoxyalkyl is preferably benzyloxyalkyl, most preferably benzyloxymethyl or benzyloxyethyl; $R^1$ as $C_8$–$C_{14}$aralkylthioalkyl is preferably benzylthioalkyl, most preferably benzylthiomethyl or benzylthioethyl.

Where $R^1$ is $C_7$–$C_{14}$aryloxyalkyl or $C_7$–$C_{14}$arylthioalkyl, aryl preferably is unsubstituted phenyl or phenyl substituted by $C_1$–$C_4$alkyl and the alkyl moiety contains 1 to 4 carbon atoms, such radicals being in particular phenoxymethyl or phenoxyethyl, or, respectively, phenylthiomethyl or phenylthioethyl.

$R^4$ as chlorine-substituted phenyl is e.g. phenyl which is mono- to trisubstituted in particular in the ortho- or para-position, and is preferably p-chlorophenyl.

$R^2$ and $R^3$ as $C_2$–$C_{21}$alkyl are e.g. ethyl, n-propyl, isopropyl, n-butyl, sec-butyl, tert-butyl, n-pentyl, n-hexyl, n-octyl, nonyl, decyl, dodecyl, tetradecyl, hexadecyl, octadecyl, eicosyl or heneicosyl. Preferred alkyl groups are those containing 2 to 12 carbon atoms, with those containing 2 to 4 carbon atoms being most preferred. $R^2$ and $R^3$ are preferably n-butyl.

$R^2$ and $R^3$ as $C_6$–$C_{12}$aryl are e.g. phenyl substituted by $C_1$–$C_4$alkyl, preferably by methyl, but are preferably unsubstituted phenyl.

$R^2$ and $R^3$ as $C_7$–$C_{19}$aralkyl are e.g. 1-phenylethyl, 2-phenylethyl, α,α-dimethylbenzyl, laurylbenzyl and, in particular, benzyl.

Particularly interesting aminouracils of the formula I are those in which $R^1$ is hydrogen and each of $R^2$ and $R^3$ independently of the other is $C_2$–$C_{12}$alkyl, phenyl or benzyl, whilst one of $R^2$ and $R^3$ may also be hydrogen.

Preferred aminouracils are those of the formula I, wherein $R^1$ is hydrogen and $R^2$ and $R^3$ are $C_2$–$C_4$alkyl.

The most preferred aminouracils are 1,3-diethyl-6-aminouracil or 1,3-di-n-butyl-6-aminouracil.

The uracils employed in the practice of this invention are known and may be obtained by known methods, e.g. as described in U.S. Patent Specification No. 2,598,936. Those compounds which are novel can be prepared by methods analogous to known ones, e.g. as described in the U.S. Patent Specification just referred to.

The uracils employed in the practice of this invention are most suitable for protecting chlorinated thermoplastics against heat-induced degradation. They may be incorporated in the thermoplastics to be stabilised singly or in admixture with one another, before processing in conventional apparatus, and in respective amounts of 0.1 to 5% by weight, preferably of 0.2 to 1.5% by weight, based on the entire composition.

A still better stabilising action is obtained by additionally using customary amounts of one of the conventional PVC stabilisers and/or additives such as epoxy compounds, preferably epoxidised fatty acid esters such as epoxidised soybean oil, phosphites, organometal compounds of metals of the second main and auxiliary group of the Periodic Table, e.g. metal carboxylates or metal phenolates, in particular metal salts of carboxylic acids containing 8 to 20 carbon atoms or of phenols containing 6 to 20 carbon atoms, e.g. calcium stearate or zinc stearate, or also inorganic salts of metals of the second auxiliary group of the Periodic Table, e.g. $ZnCl_2$, as well as organotin compounds, in particular mixtures of mono- and diorganotin compounds, such as mono-n-octyl tris-isooctyl thioglycolate and di-n-octyl bis-isooctyl thioglycolate, or organoantimony compounds such as antimony tris-isooctyl thioglycolate (isooctyl=1,1,3,3-tetramethylbutyl).

Co-stabilisers are preferably incorporated in amounts of 0.05 to 6% by weight, preferably 0.1 to 3% by weight, based on the entire composition. The ratio of aminouracil to co-stabiliser may be from 2:1 to 1:8.

Particularly suitable conventional phosphites are those of the general formulae II, III or IV

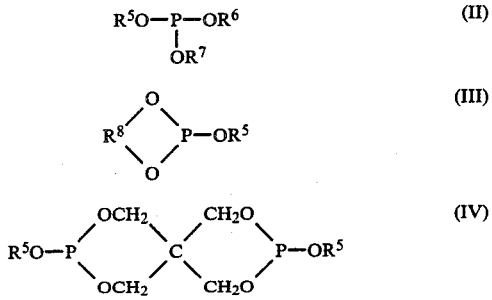

wherein each of $R^5$, $R^6$ and $R^7$ independently of one another is $C_1$-$C_{18}$alkyl, $C_1$-$C_{20}$alkenyl, $C_6$-$C_{12}$aryl, $C_7$-$C_{19}$alkaryl which is unsubstituted or substituted by hydroxy or $C_1$-$C_4$alkoxy, or is $C_5$-$C_7$cycloalkyl, and $R^8$ is $C_2$-$C_6$alkylene which is unsubstituted or substituted by $C_1$-$C_{18}$alkyl, $C_2$-$C_{13}$alkoxymethyl or $C_2$-$C_{13}$alkylthiomethyl or by phenyl, or is $C_6$-$C_{10}$arylene which is unsubstituted or substituted by $C_1$-$C_4$alkyl, or is $C_5$-$C_7$cycloalkylene.

$R^5$, $R^6$ and $R^7$ as $C_1$-$C_{18}$alkyl are e.g. methyl, ethyl, n-propyl, isopropyl, n-butyl, sec-butyl, tert-butyl, n-pentyl, n-hexyl, n-octyl, n-nonyl, decyl, dodecyl, tetradecyl, hexadecyl or octadecyl. Alkyl groups containing 8 to 18 carbon atoms are preferred.

$R^5$, $R^6$ and $R^7$ as $C_1$-$C_{20}$alkenyl are e.g. allyl, but-2-enyl, pentenyl, hexenyl, heptenyl or oleyl.

$R^5$, $R^6$ and $R^7$ as aryl may be e.g. naphthyl, biphenyl or, preferably, phenyl.

$R^5$, $R^6$ and $R^7$ as $C_7$-$C_{19}$alkaryl which is unsubstituted or substituted by hydroxy or $C_1$-$C_4$alkoxy are e.g. tolyl, ethylphenyl, xylyl, cumyl, cymyl, cresyl, 4-methoxyphenyl, 2,4-dimethoxyphenyl, alkoxyphenyl or butoxyphenyl.

$R^5$, $R^6$ and $R^7$ as $C_5$-$C_7$cycloalkyl are e.g. cyclopentyl, cycloheptyl and, in particular, cyclohexyl.

As $C_2$-$C_6$alkylene which is unsubstituted or substituted by $C_1$-$C_{18}$alkyl or phenyl, $R^8$ may be e.g. ethylene, propylene or hexamethylene, substituted by methyl, ethyl, propyl, isopropyl, butyl, hexyl, decyl, dodecyl, tetradecyl, octadecyl or phenyl, and is, in particular, 2-propyl-2-methylpropylene, 1-propyl-2-ethylpropylene, phenyethylene, or also unsubstituted ethylene.

As $C_2$-$C_6$alkylene substituted by $C_2$-$C_{13}$alkoxymethyl or $C_2$-$C_{13}$alkylthiomethyl, $R^8$ may be e.g. ethoxymethylethylene, butoxymethylethylene, octyloxymethylethylene or dodecylthiomethylethylene.

As $C_6$-$C_{10}$arylene which is unsubstituted or substituted by $C_1$-$C_4$alkyl, R is e.g. tert-butylphenylene or unsubstituted phenylene.

As $C_5$-$C_7$cycloalkylene, $R^8$ is in particular cyclohexylene.

Preferred phosphites of the formula IV are those in which $R^5$ is $C_1$-$C_{18}$alkyl and, in particular, $C_8$-$C_{18}$alkyl, and is most preferably octyl or decyl.

Very suitable phosphites are trioctyl, tridecyl, tridodecyl, tritetradecyl, tristearyl, trioleyl, triphenyl, tricresyl, tris-p-nonylphenyl or tricyclohexyl phosphite. Especially preferred phosphites are aryl-dialkyl phosphites and alkyl-diaryl phosphites, e.g. phenyldidecyl phosphite, nonylphenyldidecyl phosphite, (2,4-di-tert-butylphenyl)-didodecyl phosphite and (2,6-di-tert-butylphenyl)-didodecyl phosphite.

A particularly good stabilising action is obtained by adding to the aminouracils of the formula I at least one epoxy compound and/or metal carboxylate or metal phenolate of a metal of the second main group of the Periodic Table, preferably a calcium carboxylate, most preferably calcium stearate. A still better stabilising action is obtained by using additionally at least one zinc or cadmium carboxylate, organotin compound or organoantimony compound. Preferred organotin compounds are mixtures of mono- and diorganotin compounds.

The best stabilising action, however, is obtained by stabilising the chlorinated theremoplastics with a mixture of at least one aminouracil of the formula I, at least one epoxy compound and/or metal carboxylate or metal phenolate of a metal of the second main group of the Periodic Table, at least one zinc or cadmium carboxylate or organotin compound, and at least one of the phosphites defined above.

Surprisingly, even a relatively small concentration of an aminouracil of the formula I ensures an excellent stabilising action under these conditions.

It is preferred to use vinyl chloride polymers or copolymers for the moulding compositions of the invention. Suspension and mass polymers, and emulsion polymers having a low content of emulsifier, are preferred. Examples of suitable comonomers for the copolymers are: vinyl acetate, vinylidene chlorlde, trans-dichloroethane, ethylene, propylene, butylene, maleic acid, acrylic acid, fumeric acid or itaconic acid. Further suitable chlorinated polymers are post-chlorinated PVC and chlorinated olefins, as well as graft polymers of PVC with EVA and MBS.

The thermoplastics stabilised according to the invention are obtained by incorporating the stabilisers and, if desired, further stabilisers, in the polymer. A homogeneous mixture of stabiliser and polyvinyl chloride can be obtained e.g. using a two-roll mixer in the temperature range from 150° to 210° C. Depending on the end use of the moulding compound, further additives may also be incorporated before or simultaneously with the incorporation of the stabiliser. Examples of further additives are: lubricants (preferably montan waxes or glycerol esters), fatty acid esters, paraffins, plasticisers, fillers, carbon black, asbestos, kaolin, talcum, glass fibres, modifiers (such as impact strength additives), fluorescent whitening agents, pigments, light stabilisers, UV absorbers, flame retardants, antistats or further co-stabilisers, e.g. antioxidants, in particular phenolic antioxidants. The thermoplastic moulding compositions obtained according to the invention can be processed to moulded articles by conventional moulding methods, e.g. by extrusion, injection moulding or calendering. The use of the moulding compositions as plastisols is also possible. The stabilisers employed in the practice of this invention effect excellent stabilisation of the thermoplastic moulding compositions obtained. The light stability is also good.

The invention is illustrated in more detail by the following Examples, in which parts are by weight, unless otherwise stated.

EXAMPLE 1

A dry blend comprising each of the formulations listed below in (1)–(1e) is rolled for 5 minutes at 180° C.

on a mixer roll. Test samples having thickness of 0.3 mm are then taken from the rolled sheet obtained. These samples are subjected to heat in an oven at 180° C., and at 10 minute intervals the thermal ageing of a sample is determined according to the Yellowness Index of ASTM D 1925-70. The results are reported in the following tables.

| (1) S-PVC (K-value 64) | | | 100 parts | | |
|---|---|---|---|---|---|
| epoxidised soybean oil | | | 2 parts | | |
| Static heat test (180° C.) | | | | | |
| Thermal ageing (min) | 0 | | 10 | | 20 |
| Yellowness Index | 28.0 | | 80.0 | | >100 |
| (1a) S-PVC (K-value 64) | | | 100 parts | | |
| epoxidised soybean oil | | | 2 parts | | |
| 1,3-diethyl-6-aminouracil | | | 0.6 part | | |
| Static heat test (180° C.) | | | | | |
| Thermal ageing (min) | 0 | 10 | 20 | 30 | 40 | 50 |
| Yellowness Index | 3.8 | 6.7 | 9.5 | 17.9 | 29 | 52.9 |
| (1b) S-PVC (K-value 64) | | | 100 parts | | |
| epoxidised soybean oil | | | 2 parts | | |
| 1,3-di-n-butyl-6-aminouracil | | | 0.6 part | | |
| Static heat test (180° C.) | | | | | |
| Thermal ageing (min) | 0 | 10 | 20 | 30 | 40 | |
| Yellowness Index | 2.5 | 6.3 | 14.7 | 24.6 | 52.7 | |
| (1c) S-PVC (K-value 64) | | | 100 parts | | |
| epoxidised soybean oil | | | 3 parts | | |
| zinc stearate | | | 0.15 part | | |
| calcium stearate | | | 0.35 part | | |
| tridecyl phosphite | | | 0.55 part | | |
| Static heat test (180° C.) | | | | | |
| Thermal ageing (min) | 0 | 10 | 20 | 30 | 40 | |
| Yellowness Index | 25.2 | 33.7 | 33.7 | 69.8 | >100 | |
| (1d) S-PVC (K-value 64) | | | 100 parts | | |
| epoxidised soybean oil | | | 3 parts | | |
| 1,3-di-ethyl-6-aminouracil | | | 0.46 part | | |
| zinc stearate | | | 0.15 part | | |
| calcium stearate | | | 0.35 part | | |
| tridecyl phosphite | | | 0.55 part | | |
| Static heat test (180° C.) | | | | | |
| Thermal ageing (min) | 0 | 10 | 20 | 30 | 40 | |
| Yellowness Index | 2.3 | 6.0 | 9.5 | 14.7 | 29.4 | |
| (1e) S-PVC (K-value 64) | | | 100 parts | | |
| epoxidised soybean oil | | | 3 parts | | |
| 1,3-di-n-butyl-6-aminouracil | | | 0.6 part | | |
| zinc stearate | | | 0.15 part | | |
| calcium stearate | | | 0.35 part | | |
| tridecyl phosphite | | | 0.55 part | | |
| Static heat test (180° C.) | | | | | |
| Thermal ageing (min) | 0 | 10 | 20 | 30 | 40 | |
| Yellowness Index | 2.4 | 4.7 | 7.6 | 14.9 | 44.0 | |

EXAMPLE 2

A dry blend consisting of 100 parts of S-PVC (K-value 64), 2 parts of epoxidised soybean oil and 0.6 part of one of the aminouracils listed in the following table, is rolled for 5 minutes at 180°0 C. on a mixer roll. The rolled sheet obtained is processed at 180° C. for 1 minute to 1 mm sheets (panels) which are visually assessed for haze. The results are reported in the following table.

| 1,3-diethyl-6-aminouracil | no haze |
|---|---|
| 1,3-di-n-butyl-6-aminouracil | no haze |

EXAMPLE 3

A dry blend consisting of 100 parts of S-PVC (K-value 64), 2 parts of epoxidised soybean oil and 0.46 part of 1,3-diethyl-6-aminouracil is rolled for 5 minutes at 180° C. pn a mixer roll. The rolled sheet so obtained is processed at 180° C. for 1 minute to 1 mm sheets (panels). The degree of yellowing determined in accordance with the Yellownes Index of ASTM D 1925-70 is 16.5.

EXAMPLE 4

A dry blend consisting of 100 parts of S-PVC (K-value 64), 2 parts of epoxidised soybean oil and 0.6 part of 1,3-di-n-butyl-6-aminouracil is processed to 1 mm sheets (panels) as described in Example 3. The degree of yellowing determined in accordance with the Yellowness Index of ASTM D 1925-70 is 15.9.

EXAMPLE 5

A dry blend consisting of 100 parts of S-PVC (K-value 64), 3 parts of epoxidised soybean oil, 0.46 part of 1,3-diethyl-6-aminouracil, 0.15 part of zinc stearate, 0.35 parts of calcium stearate and 0.55 part of tridecyl phosphite, is processed to 1 mm sheets (panels) as described in Example 3. The degree of yellowing determined in accordance with the Yellowness Index of ASTM D 1925-70 is 13.9.

EXAMPLE 6

A dry blend consisting of 100 parts of S-PVC (K-value 64), 3 parts of epoxidised soybean oll, 0.6 part of 1,3-di-n-butyl-6-aminouracil, 0.15 part of zinc stearate, 0.35 parts of calcium stearate and 0.55 part of tridecyl phosphite, is processed to 1 mm sheets (panels) as described in Example 3. The degree of yellowing determined in accordance with the Yellowness Index of ASTM D 1925-70 is 14.1.

A sheet having a degree of yellowing of 64.9 (determined in accordahce with the Yellowness Index of ASTM D 1925-70) is obtained with a dry blend as described in Examples 5 and 6, but without the addition of aminouracil.

What is claimed is:

1. A thermoplastic moulding composition based on a vinyl chloride polymer, which composition contains 0.1 to 5% by weight of an aminouracil of the formula

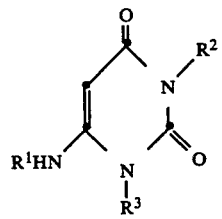

(I)

wherein $R^1$ is hydrogen, and $R^2$ and $R^3$ are $C_2$–$C_4$alkyl.

2. A moulding composition according to claim 1 wherein the aminouracil is 1,3-di-n-butyl-6-aminouracil.

3. A moulding composition according to claim 1, wherein the aminouracil is 1,3-diethyl-6-aminouracil.

4. A moulding composition according to claim 1, which additionally contains one or more conventional PVC stabilisers additives or mixtures thereof selected from the group consisting of epoxy compounds pounds, phosphites, organometal compounds of metals of the second main and auxiliary group of the Periodic Table, inorganic salts of metals of the second auxiliary group of the Periodic Table, and organotin compounds or organoantimony compounds.

5. A moulding composition according to claim 4, which contains, as conventional additional ingredient, at least one epoxy compound a metal carboxylate or metal phenolate of a metal of the second main group of the Periodic Table or mixtures thereof.

6. A moulding composition according to claim 4, which contains, as conventional additional ingredient, at least one phosphite.

7. A moulding composition according to claim 5, which additionally contains at least one phosphite.

8. A moulding composition according to claim 5, which additionally contains at least one zinc or cadmium carboxylate or organotin compound.

9. A moulding composition according to claim 8, which additionally contains at least one phosphite.

10. A method of stabilising vinyl chloride polymers, which comprises incorporating therein an aminouracil according to claim 1.

* * * * *